United States Patent
Stöger

(10) Patent No.: US 9,270,122 B2
(45) Date of Patent: Feb. 23, 2016

(54) CONVERTER DEVICE

(75) Inventor: Christian Stöger, Vienna (AT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 83 days.

(21) Appl. No.: 14/111,672

(22) PCT Filed: Mar. 13, 2012

(86) PCT No.: PCT/EP2012/054373
§ 371 (c)(1),
(2), (4) Date: Nov. 7, 2013

(87) PCT Pub. No.: WO2012/139846
PCT Pub. Date: Oct. 18, 2012

(65) Prior Publication Data
US 2014/0070612 A1    Mar. 13, 2014

(30) Foreign Application Priority Data
Apr. 13, 2011 (DE) .......................... 10 2011 007 261

(51) Int. Cl.
*H02J 4/00* (2006.01)
*H05B 33/08* (2006.01)
(Continued)

(52) U.S. Cl.
CPC ................. *H02J 4/00* (2013.01); *H02M 3/158* (2013.01); *H05B 33/0815* (2013.01); *H02M 2001/009* (2013.01); *H02M 2001/0045* (2013.01);
(Continued)

(58) Field of Classification Search
CPC ... H05B 33/0815; H02J 4/00; Y02B 70/1416; H02M 2001/0045; H02M 2001/009

USPC .......... 363/16, 59, 60, 61; 323/222, 282, 267; 327/536

See application file for complete search history.

(56) References Cited

U.S. PATENT DOCUMENTS 4,683,415 A    7/1987  Zimmerman ................. 323/282
5,359,278 A   10/1994  Notohara et al. ............. 323/222

(Continued)

FOREIGN PATENT DOCUMENTS

CN   101065994 A   10/2007  ............. H05B 33/08
DE    69415258 T2    6/1999  ............. G03G 15/00

(Continued)

OTHER PUBLICATIONS

International Search Report and Written Opinion, Application No. PCT/EP2012/054373, 14 pages, Sep. 5, 2012.

(Continued)

*Primary Examiner* — Tuyet Vo
*Assistant Examiner* — Henry Luong
(74) *Attorney, Agent, or Firm* — Slayden Grubert Beard PLLC

(57) ABSTRACT

A converter device including a voltage converter and means for supplying different currents and/or voltages for at least two different loads, e.g. LEDs or LED groups, wherein the voltage converter provided is a primary converter with resonant circuit, which outputs a variable voltage at an output, said voltage encompassing voltages of from <0V to at least the highest voltage required in the converter device for current outputting, and wherein the means for supplying different currents and/or voltages are formed by at least two secondary converters having output storage units and switching means for the controlled connection of their output storage units to the output of the primary converter.

18 Claims, 6 Drawing Sheets

(51) Int. Cl.
*H02M 3/158* (2006.01)
*H02M 1/00* (2007.01)
*H02M 1/34* (2007.01)

(52) U.S. Cl.
CPC ...... *H02M2001/346* (2013.01); *Y02B 70/1425* (2013.01); *Y02B 70/1491* (2013.01); *Y10T 307/406* (2015.04)

(56) References Cited

U.S. PATENT DOCUMENTS 5,572,414 A * 11/1996 Komori ............................ 363/60
7,688,600 B2    3/2010 Sauerlander et al. ........... 363/17
2007/0024255 A1 * 2/2007 Yasumura ..................... 323/267
2010/0045251 A1 * 2/2010 Murota ................. H02M 3/158
                                                              323/282
2010/0315016 A1   12/2010 Hoogzaad ..................... 315/224

FOREIGN PATENT DOCUMENTS

DE   102007004877 A1   8/2008   ............. H05B 37/02
WO      2012/139846 A1  10/2012   ............. H05B 33/08

OTHER PUBLICATIONS

Chinese Office Action, Application No. 201280018143.4, 9 pages, May 26, 2015.

* cited by examiner

CONVERTER DEVICE

CROSS-REFERENCE TO RELATED APPLICATIONS

This application is a U.S. National Stage Application of International Application No. PCT/EP2012/054373 filed Mar. 13, 2012, which designates the United States of America, and claims priority to DE Application No. 10 2011 007 261.6 filed Apr. 13, 2011, the contents of which are hereby incorporated by reference in their entirety.

TECHNICAL FIELD

This disclosure relates to a converter device having a voltage converter and means for supplying different currents or voltages for at least two different loads, for example LEDs or LED groups.

BACKGROUND

In engineering, there is often the situation of supplying a plurality of loads with electrical energy using adapted control electronics. In this case, lighting devices, in particular with LEDs (LED—light-emitting diode), are increasingly important, for example; lights of motor vehicles, in particular, are being implemented more and more frequently using LEDs, and in vehicle construction, in particular, there is then the problem that a plurality of different lights must be operated with different electrical characteristic variables, that is to say voltage or current, using the control electronics, in which case a further difficulty is that the voltage supply (on-board voltage) is generally not particularly stable. In addition, it should be borne in mind that different light functions are provided in a very tight space beside one another, for example in a vehicle headlight or in a tail light. It would therefore be desirable, also for reasons of space, for an individual space-saving electronic system to be sufficient.

As far as the implementation of lighting systems with LED lights is concerned, the voltage to be applied to an LED light is known to result from the current to be set; in addition to the brightness, the current also determines the light color; it goes without saying that the voltage also depends on whether there is one LED or whether a plurality of LEDs are connected in series. Ultimately, the voltage here is therefore only the result of variables to be set.

It is conventional in practice to use a separate converter circuit for each light function, which circuit generates a stable current for the LEDs from the unstable supply network. However, this is complicated and expensive, and a relatively large amount of space is moreover also required, apart from the relatively high losses in such electronics. In this context, it is also already occasionally common practice to use a voltage converter to generate a central stable voltage from which the corresponding current is then generated for a plurality of LED lights. Only one conversion stage is provided here for a plurality of outputs, in which stage the current is then divided among a plurality of channels; control using a time offset is provided for this purpose, with the result that only one light can ever be switched on for a short period of time (in the microseconds range) or else considerable losses occur in the circuit. This known principle can be used only for low currents where the losses are small on account of the low current intensity.

SUMMARY

One embodiment provides a converter device having a voltage converter and means for supplying different currents or voltages for at least two different loads, for example LEDs or LED groups, wherein a primary converter with a resonant circuit is provided as the voltage converter and outputs, at an output, a variable voltage which encompasses voltages from <0 V to at least the highest voltage needed to output current in the converter device, and in that the means for supplying different currents or voltages are formed by at least two secondary converters having output stores and switching means for connecting their output stores to the output of the primary converter in a controlled manner.

In a further embodiment, the switching means of the respective secondary converter connect its output store to the primary converter output when its variable voltage becomes equal to the respective secondary converter output voltage.

In a further embodiment, the switching means of the respective secondary converter disconnect its output store from the primary converter output when this output store has stored sufficient energy for the next period duration.

In a further embodiment, the primary converter is a step-up converter, preferably a boost converter.

In a further embodiment, the primary converter output is formed by a circuit point between an input inductance and a selective blocking means, for example a diode, provided between the input inductance and an energy store.

In a further embodiment, the primary converter has a primary controller which controls a switching means, for example a transistor, in a shunt branch.

In a further embodiment, the primary controller opens the switching means when the current through the switching means is at a minimum, but preferably only when the current through the switching means is positive.

In a further embodiment, the primary controller opens the switching means when the current through the switching means passes through a positive zero crossing.

In a further embodiment, the converter device includes a switch-on connection between the energy store of the primary converter and its input in order to cause a buck converter behavior of the secondary converters.

In a further embodiment, each secondary converter has a secondary controller which is assigned the voltage at the secondary converter output or at the output store as a controlled variable.

In a further embodiment, each secondary converter has current sensor means, for example a shunt resistor or an inductive current detector, for detecting the current from the output store to the secondary converter output, the detected current being supplied to a secondary controller of the secondary converter as a controlled variable.

In a further embodiment, the secondary controller uses the product of the voltage and the current as a controlled variable for the power output at the secondary converter output.

In a further embodiment, the secondary converter has separating means, for example a switching transistor, for separating the secondary converter output from the output store.

BRIEF DESCRIPTION OF THE DRAWINGS

Example embodiments are explained below in detail with reference to the drawings, in which.

DETAILED DESCRIPTION

Figure 1:
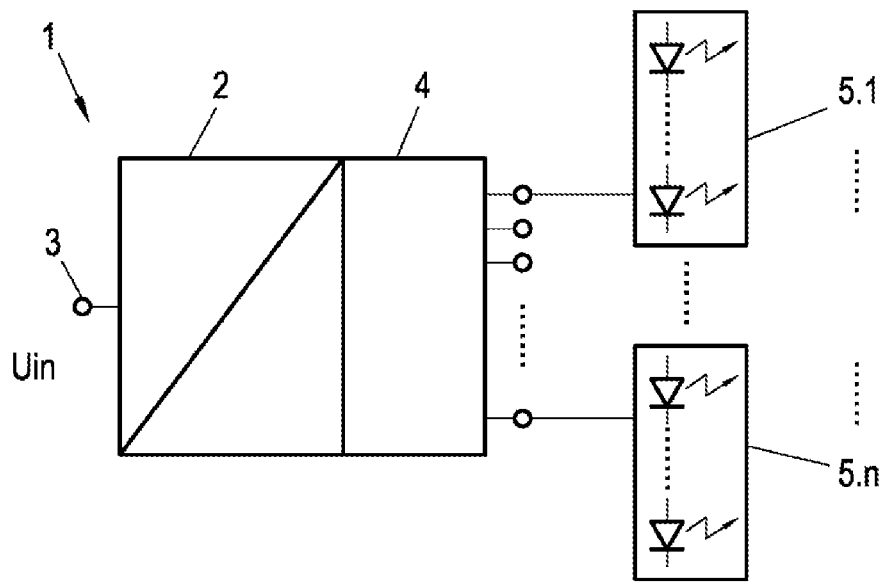
FIG. 1 shows a very schematic circuit diagram of a converter device having a voltage converter and current and voltage supply means for a plurality of loads, for example LED lights.

Embodiments of the present invention provide a converter device like that stated at the outset which makes it possible to supply a plurality of different loads with the desired different currents or voltages with the lowest possible circuitry complexity and with a space-saving implementation. The object in this case is also to minimize switching losses in the converter device and overall to provide a particularly efficient converter device.

In order to achieve the stated object, some embodiments provide a converter device like that stated at the outset which is wherein a primary converter with a resonant circuit is provided as the voltage converter and outputs, at an output, a variable voltage which encompasses voltages from <0 V to at least the highest voltage needed to output current in the converter device, and in that the means for supplying different currents or voltages are formed by at least two secondary converters having output stores and switching means for connecting their output stores to the output of the primary converter in a controlled manner.

A "resonant converter", a primary converter with a resonant circuit, is therefore provided in the present converter device and generates an AC voltage at its resonant circuit. This AC voltage encompasses voltage values of, for example, 0 V to a maximum voltage, and all required voltages from 0 V to the maximum voltage can be tapped off from such an AC voltage; taps for the respectively required voltage values are now provided for the secondary converters which are provided as means for supplying the different currents or voltages, that is to say the switching means of the secondary converters each connect the output store of the associated secondary converter to the output of the primary converter at the suitable time. It goes without saying that the primary converter should be dimensioned accordingly so that sufficient energy is taken from its input, and the secondary converters ensure that sufficient energy respectively arrives at their outputs. Since the voltage can be tapped off only once per period of the AC voltage, an output store needs to be provided for each secondary converter, which output store provides the required energy for the load after charging. However, a suitable capacitor can be used for this purpose without any problems, unlike in other converters.

Applying the AC voltage to the capacitor (or generally output store) with the instantaneous voltage at the output store or capacitor makes it possible to avoid equalizing currents, and it is therefore particularly advantageous if the switching means of the respective secondary converter connect its output store to the primary converter output when its variable voltage becomes equal to the respective secondary converter output voltage. On the other hand, provision is preferably made for the switching means of the respective secondary converter to disconnect its output store from the primary converter output when this output store has stored sufficient energy for the next period duration.

The transmitted power of a resonant converter depends on its frequency. Since the outputs can be charged only once per period, a minimum frequency must be complied with in order to obtain an optimum current/voltage profile at the secondary converter output; this means that a minimum amount of energy is transmitted.

The primary converter is preferably a boost converter in order to provide higher voltages at its output than are present at the input. As mentioned, one aspect of the present disclosure is to achieve increased efficiency. In conventional designs of converters which generate an AC voltage, a transformer or else at least two switching elements is/are used. In both variants, additional electrical losses are produced and there is extra outlay on components. In the present resonant primary converter, a separate (parallel) resonant circuit with its own resonant inductance is preferably used, in which case the latter is required since there is no transformer, the stray inductance of which would be available for resonance. When a boost topology is desired in particular, the voltage converter may be constructed from an input inductance and a switching or blocking means in the series branch and (in a shunt branch connected in between) a resonant circuit with switching means. A switching transistor, for example, can be provided as the switching means and a controller—the primary controller—is preferably assigned to these switching means or this switching transistor.

As mentioned, the energy transmitted in this topology depends on the frequency at which the switching transistor or generally the switching means is switched on and off; the maximum frequency corresponds to the resonant frequency defined by the resonant inductance and resonant capacitance and the primary controller must be designed therefor. The secondary converters should be supplied with a minimum frequency at their input in order to achieve the required accuracy (for example little current ripple) at their output.

Accordingly, one embodiment is distinguished by virtue of the fact that the primary converter output is formed by a circuit point between an input inductance and a selective blocking means, for example a diode, provided between the input inductance and an energy store. It is also favorable if the primary converter has a primary controller which controls a switching means, for example a transistor, in a shunt branch.

In order to keep losses as low as possible, it is also advantageous in this case if the primary controller opens the switching means when the current through the switching means is at a minimum, but preferably only when the current through the switching means is positive.

On the other hand, it is also advantageous if the primary controller opens the switching means when the current through the switching means passes through a positive zero crossing. In contrast, if the current profile changes from positive to negative, switching is preferably not carried out since the negative current would flow with comparatively high losses via the parasitic diode of the switching transistor. The first-mentioned case with switching at the minimum current when the current is positive may likewise keep the losses low. Such a situation may arise during operation in practice, for example, if the resonant current does not reach a zero crossing on account of a superimposed input current and a brief imbalance with respect to the amplitude of the two currents which cannot be excluded. The minimum current can be detected by means of the voltage drop across the switching means or transistor or by a current measuring apparatus, for instance a shunt, and can be determined by the primary controller using the measurement signal. However, it is usually more advantageous to use the positive zero crossing of the primary output voltage for this purpose since this voltage is greater and can therefore be measured in an easier manner.

If only voltages below the supply voltage need to be generated, provision may be made for the energy store of the primary converter to be connected to the primary converter input. A switchable connection between the energy store and the input of the primary converter is expediently provided for this purpose in order to cause a buck converter behavior in this manner, this function also being only temporarily provided, namely when the switch in the connection is switched on.

As mentioned, the switching means in the respective secondary converter is closed when the voltages at the input and at the output (actually at the output store) of the secondary converter are the same. The output store is then charged by the voltage, which continues to rise, at the input until there is sufficient energy in the output store. A secondary controller in each secondary converter is preferably used for this purpose, for example, and determines the state of sufficient energy using its control algorithm. The voltage (via voltage measuring means known per se) at the secondary converter output, for example, can be used as a controlled variable for this purpose, but it is also conceivable to use the current flowing from the output store into the output for this purpose. This current can be detected, for example, with the aid of a shunt resistor or an inductive current detector, generally a current sensor means. The current reaches its maximum when the secondary controller decides to open the switching element. Finally, a power controller is also conceivable, in which case the secondary controller is then provided with both the output voltage and the current. In all of the abovementioned cases, a setpoint value is predefined to the secondary controller via a corresponding actuator, for instance a microcontroller which is present per se or another suitable circuit.

In order to avoid always having to discharge the output store for briefly connecting and disconnecting the output of the secondary converter, it is also advantageous if the secondary converter has separating means, for example a switching transistor, for separating the secondary converter output from the output store. For this embodiment with the separating means for separating the secondary converter output from the output store, it is also advantageous that the control parameters for the secondary converter output are retained even if this output is disconnected.

It is characteristic of the present converter device that it manages with only one (main) inductance and that the secondary converter, in particular, is free of a (storage) inductance.

FIG. 1 illustrates a converter device 1 according to an example embodiment. The input 3 of a voltage converter 2 is connected to a supply voltage Uin (not illustrated in any more detail), for example the voltage supply system of a vehicle. Means 4 are also provided in order to supply different currents and/or voltages to different loads 5.1 ... 5n. These loads, 5.i for short, where i=1, ... n (where n may also be equal to 2 in the extreme case), are, for example, LED lights of a motor vehicle, in which case it is known that different LED lights (for example brake light, tail light etc.) can be combined in a lighting unit. In this case, the current through the LEDs is responsible for the brightness and color. The loads 5.i may be individual LEDs per se or else groups of LEDs, in particular series circuits of LEDs, in which case the number of LEDs may be different from load to load. Accordingly, different voltages but also different currents are generally required at the outputs of the means 4.

Figure 2:
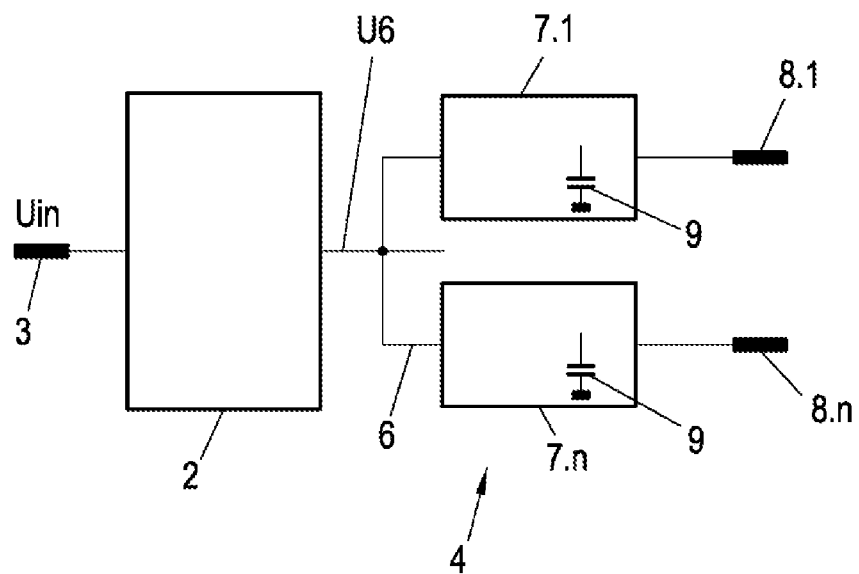
FIG. 2 shows a block diagram of one embodiment of such a converter device having a primary converter and a plurality of secondary converters, one secondary converter for each load.
Figure 5:
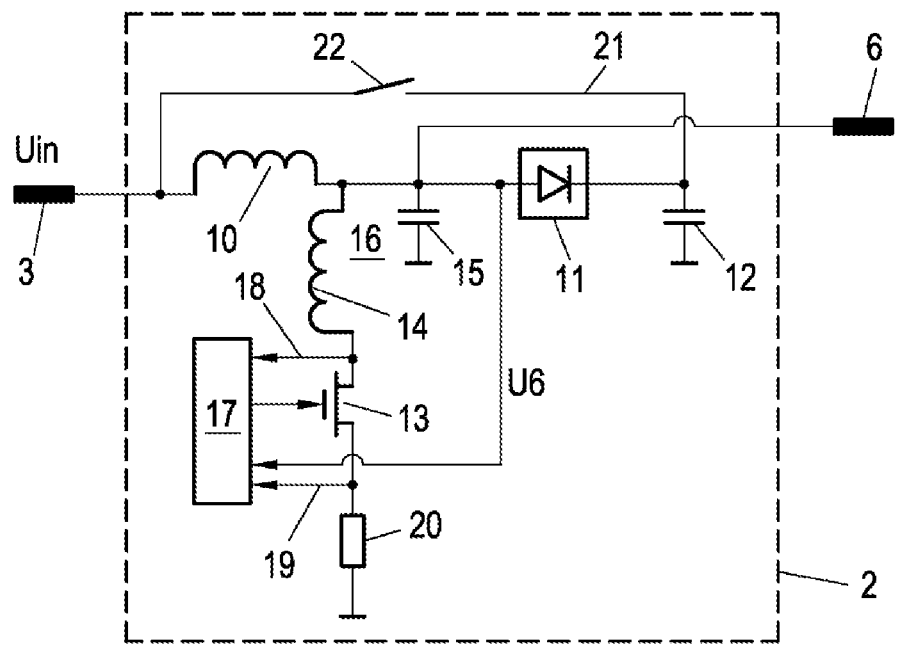
FIG. 5 shows a detailed circuit diagram of the primary converter of the converter device according to FIG. 2.

According to FIG. 2, the converter device 1 has a voltage converter, called primary converter 2 below, which, as will be explained in more detail below using FIG. 5, is a resonant converter and to the output 6 of which a plurality of secondary converters 7.1, ... 7n, again 7.i for short below, where i=1. . . n, are connected. There is a secondary converter 7.i for each load 5.i (not shown in FIG. 2), the respective load 5.i according to FIG. 1 being connected to the respective output 8.i (or 8.1 ... 8n). Such separate secondary converters 7.i are provided since a different voltage is required or an adapted current must be provided for each load, for example LED lights, depending on the number of LEDs, as a product of the current and the number of LEDs. An AC voltage U6 is generated at the output 6 of the primary converter 2 for this purpose from the unstable voltage supply Uin at the input 3 of the primary converter 2, which AC voltage encompasses all voltages needed for the LED lights, that is to say loads 5.i, during a period. An AC voltage U6 is therefore present at the output 6 of the primary converter 2 and, when this AC voltage U6 which is derived from the input voltage Uin reaches the value of the respective output voltage, for example U1, U2 or Un, of a secondary converter 7.i, an output store 9 present there, as schematically indicated in the secondary converters 7.1 in FIG. 2, is connected; said store is then charged with electrical energy until the required energy for the respective period is available at the secondary converter output 8.i, in which case the voltage U6 is then disconnected from the output store 9 again.

The primary converter 2 accordingly has to ensure that sufficient energy is taken from the input 3, in which case the n secondary converters 7.i are provided with the energy in a distributed manner so that sufficient energy arrives at their outputs 8.i.

Figure 3:
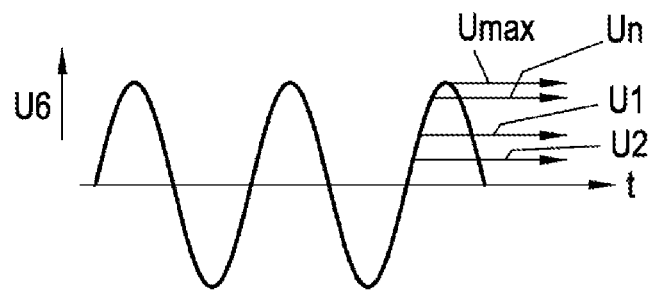
FIGS. 3 and 4 show schematic diagrams of the output voltage of the primary converter of this converter device in order to illustrate the method of operation of the converter device according to FIG. 2.

This principle of tapping off the respectively required voltage U1 etc. is illustrated only very schematically in FIG. 3 which also shows an idealized AC voltage U6 as the output voltage U6 of the primary converter. This output voltage U6 runs to a maximum value Umax and, in the range from 0 to Umax, voltages are tapped off from the secondary converters 7.i as required, for example U1 from the secondary converter 7.1, U2 from a secondary converter 7.2 or Un from the secondary converter 7n, to be precise whenever the voltage U6 reaches the value of the voltage at the respective output store 9.

The output store 9 is preferably a capacitor. Equalizing currents are avoided when connecting the AC voltage to the capacitor with the instantaneous capacitor voltage.

Figure 4:
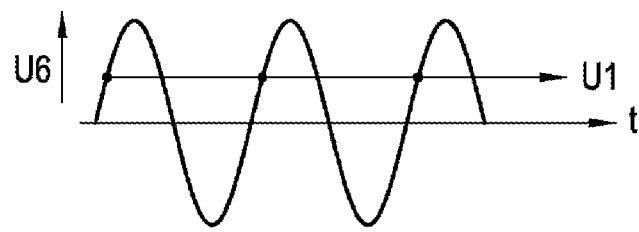

For completion, FIG. 4 illustrates the periodic connection of the AC voltage U6 at a value U1 to the capacitor or generally output store 9 of the first secondary converter 7.1.

If the required voltages of the loads 5.i at the outputs 8.i can be above the input voltage U3, it is necessary for the primary converter 2 to have a topology which makes it possible to step up the voltage. Therefore, the primary converter 2 is preferably a boost converter in all cases.

Each secondary converter 7.i has the following properties: as mentioned, it connects its output store 9 to the output 6 of the primary converter 2 when the voltage U6 there, which is applied to its output 8.i or output store 9, passes precisely that point; cf. FIGS. 3 and 4. It must also disconnect its output store 9 from the output 6 of the primary converter 2 when the output store 9 has sufficient energy for its output 8.i over the duration of the next period, cf. the periods in FIG. 4.

The secondary converters 7.i can be constructed with a few switching elements and one secondary controller, the secondary controller operating the switching elements, as will be explained in more detail below using FIG. 9. Therefore, in principle, there is no need for a further inductance for the output; the single essential inductance or main inductance is in the primary converter 2, as shall now be explained in more detail using FIG. 5.

According to FIG. 5, the primary converter 2 has an input inductance or a coil 10 as well as a selective switching or blocking means 11 in series therewith, preferably in the form of a diode for reasons of costs, in which case an energy store 12 is connected to said switching or blocking means. A switching means 13, preferably in the form of a switching transistor, in particular a field effect transistor, is provided between the inductance 10 and the blocking means 11. In this respect, the structure of the primary converter 2 corresponds to a boost converter known per se. Moreover, a resonant inductance 14 is provided in the shunt branch to the switching means 13 and forms a resonant circuit 16 together with a resonant capacitor 15 connected in parallel therewith. In this respect, the voltage converter (boost converter) is in the form of a resonant converter 2. In this case, the output 6 is at the connecting point between the input inductance 10, the resonant inductance 14, the resonant capacitor 15 and the switching or blocking means 11, that is to say before "rectification" by the blocking means 11 and not after it, as otherwise conventional, namely at the output store 12.

The components 10, 11 and 12 may be dimensioned as in a conventional converter, in which case the input inductance 10 may have a value of 3 µH, for example, and a resistance of 20 mΩ may be set for the switching transistor 13. A Schottky diode having a current-carrying capacity of 5 A to 8 A could be used as the blocking means 11, for example, and a capacitor of 50 µF can be used as the output store 12.

The components of the resonant circuit 16 have substantially smaller dimensions, in which case the resonant coil 14 may have an inductance of 330 nH and the resonant capacitor may have a capacitance of 150 nF, for example.

Figure 6:
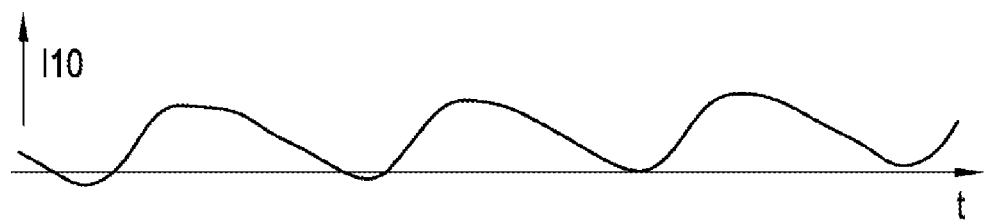
FIG. 6 shows a diagram of the profile of the current through the input inductance of the primary converter according to FIG. 5.

It is advantageous that harmonics scarcely occur in the current from the input 3 on account of the resonant circuit 16, with the result that the harmonic load of the input inductance 10 is virtually canceled. FIG. 6 illustrates, by way of example, a current I10 through the input inductance 10, in which case there is a mode or less good sinusoidal shape. Therefore, in the present primary converter 2, it is possible to dispense with the input filter which is otherwise required, which yields a saving despite the resonant circuit components which may just have very small dimensions.

Figure 7A:
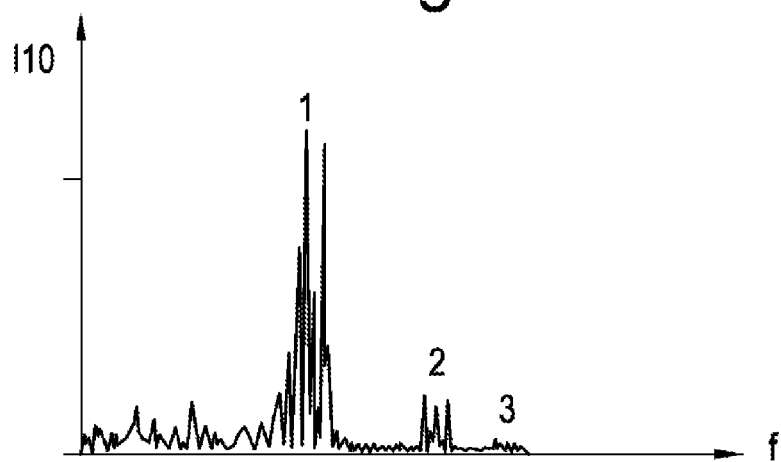
FIG. 7A shows a frequency spectrum diagram of harmonics of the current through the input inductance of the primary converter according to FIG. 5, in which case it is clear that the second and third harmonics are still just visible, but harmonics above them can no longer be measured.

FIG. 7A illustrates, by way of example, a frequency spectrum of the current I10 through the input inductance 10, in which case it emerges that the second and third harmonics are just still visible but higher harmonics can no longer be measured.

Figure 7B:
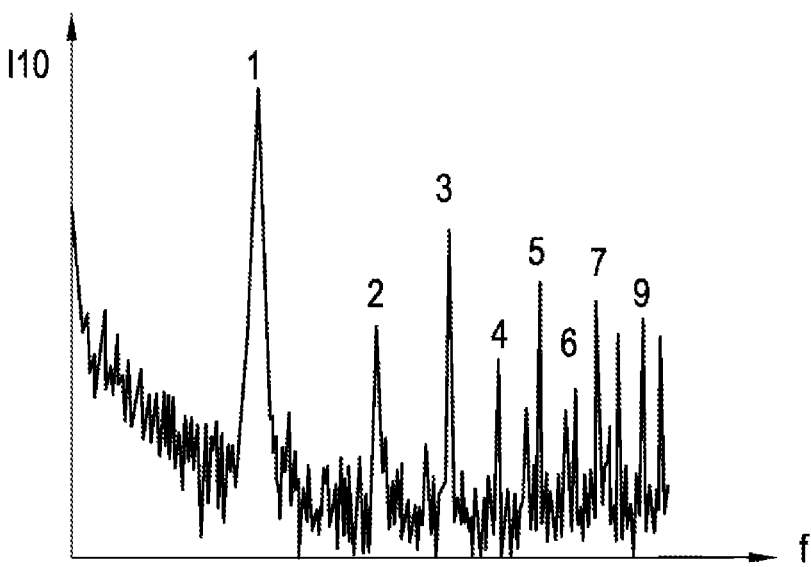
FIG. 7B shows, for comparison, the spectrum of an input current in a conventional converter with an input filter, in which case substantially more (higher) harmonics are present.

In comparison with this, FIG. 7B shows an example of a frequency spectrum of the input current Iin for a conventional converter with an input filter, in which case the ninth harmonic, for example, can also still be easily seen (the harmonics are denoted "1" to "3" and "1" to "9" in FIGS. 7A and 7B, respectively, in which case "8" has been omitted in FIG. 7B for reasons of space).

A frequency range of 100 kHz to 3 MHz has been used for both figures, FIGS. 7A and 7B.

In the present embodiment, there is therefore a considerably lower loss component from the harmonics in the inductance 10 in comparison with the conventional solution, in which case the resistance of the inductance 10 is considerably higher for harmonics than for fundamentals.

The function of the primary converter 2 according to FIG. 5 is controlled by a primary controller 17. This primary controller 17 must take into account the fact that the energy transmitted in the present primary converter 2 depends on the frequency at which the switching transistor 13 is switched on and off, the maximum frequency corresponding to the resonant frequency of the resonant circuit 16. In this case, a minimum frequency is required for the secondary converters 7.i at their input, the output 6 of the primary converter, in order to achieve the desired accuracy (maximum degree of "ripple") at the respective output 8.i.

The output of the primary controller 17 is connected to the switching transistor 13 in order to switch the latter on and off, as mentioned. Two inputs 18, 19 of the primary controller 17 are connected to the drain and source electrodes of the switching transistor 13, in which case a resistor 20 may moreover be provided as a current measuring resistor.

Figure 8A:
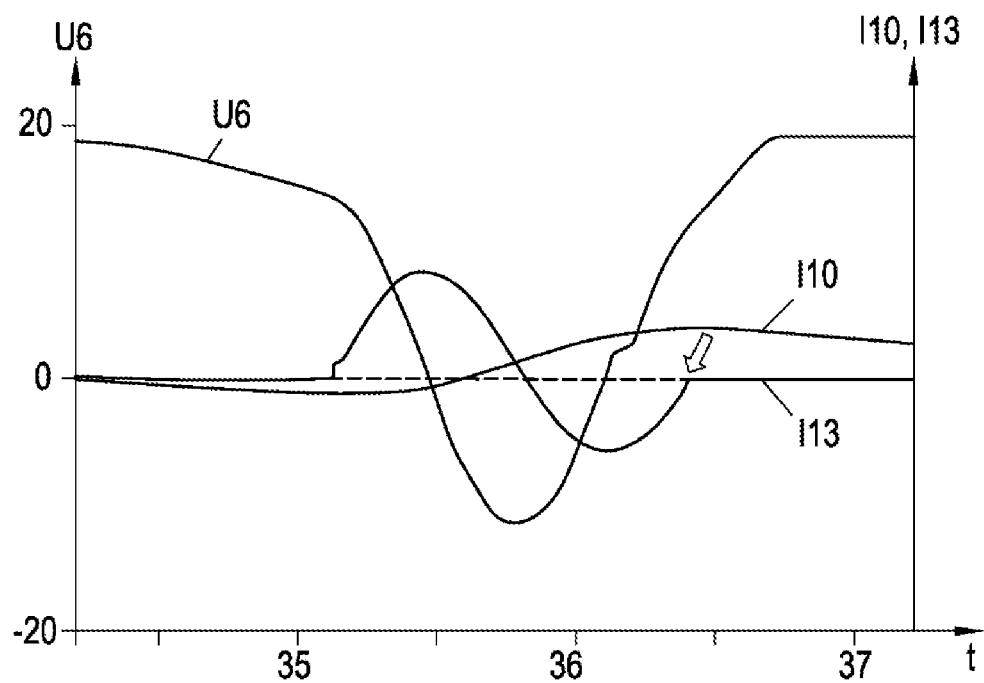
FIGS. 8A and 8B show two current/voltage diagrams for illustrating the times at which the switching means in the primary converter are switched in order to avoid losses as far as possible.

The primary converter 2 operates as efficiently as possible when minimum losses occur in the switching transistor 13. This may be achieved by virtue of the fact that the primary controller 17 switches off the switching transistor 13 when the current rises from negative to positive and has a zero crossing, in which case switching is carried out at the zero crossing, see arrow in FIG. 8A: FIG. 8A illustrates the voltage U6 at the output of the primary converter 2, the current I10 through the input inductance and the current I13 through the switching transistor 13. The other zero crossing, namely from positive to negative, should preferably not be selected for switching since the negative current would then flow via the parasitic diode (not illustrated in FIG. 5) of the switching transistor 13, which would signify corresponding losses.

Figure 8B:
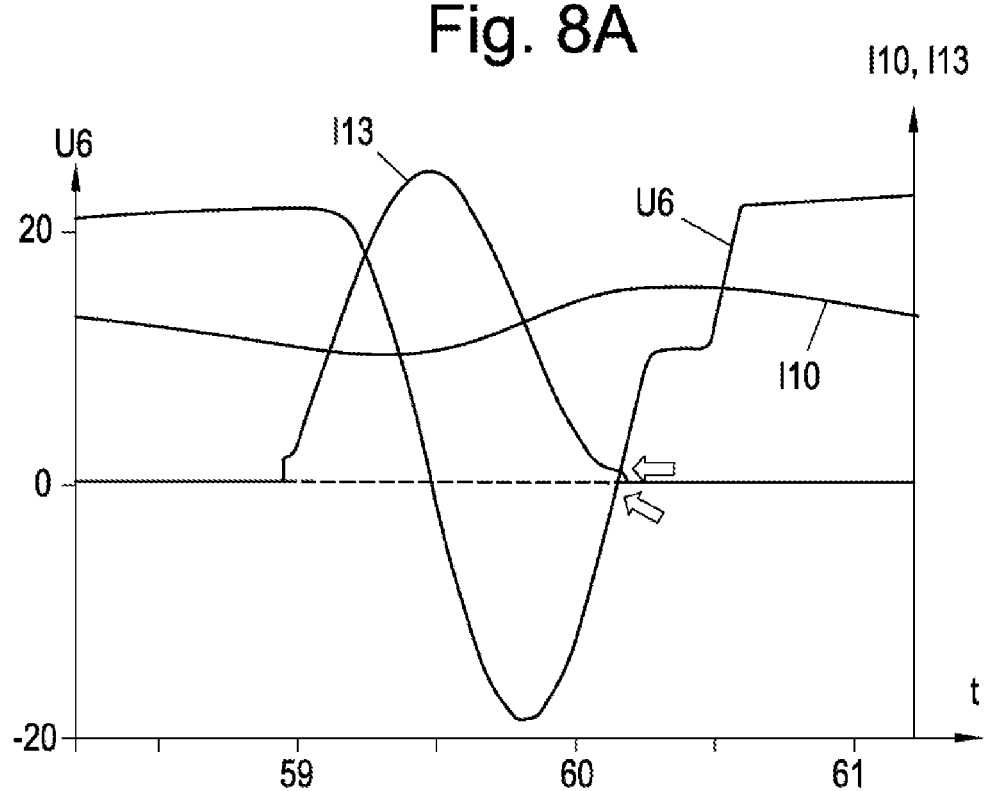

Situations may result in which there is no such current zero crossing, cf. FIG. 8B, for example in the event of a sudden load or voltage change or when starting up the converter device. In these special cases, switching is expediently carried out at the minimum current, cf. FIG. 8B, in which case the switching losses can also be minimized here.

Although this minimum current can likewise be detected by the primary controller 17 by means of the voltage drop across the transistor 13 (see the connections 18, 19) or with the aid of a current measuring resistor, namely the resistor 20, it is more advantageous here to instead use the simultaneous positive zero crossing of the output voltage U6 of the primary converter 2 since this output voltage U6 is larger than the current and can therefore be measured in an easier manner. This measurement is specifically not illustrated in any more detail in FIG. 5 for the sake of better clarity but is conventional per se, and an input U6 for the measured output voltage U6 is schematically illustrated on the primary controller 17.

If there is no need to step up the voltage, rather only output voltages U6 below the supply voltage Uin need to be generated, the energy store 12 in the primary converter 2 can be combined with the input 3, see the connection 21 in FIG. 5.

However, in order to be flexible for other possible operating situations, a switching element 22 is preferably arranged in this connection 21.

Figure 9:
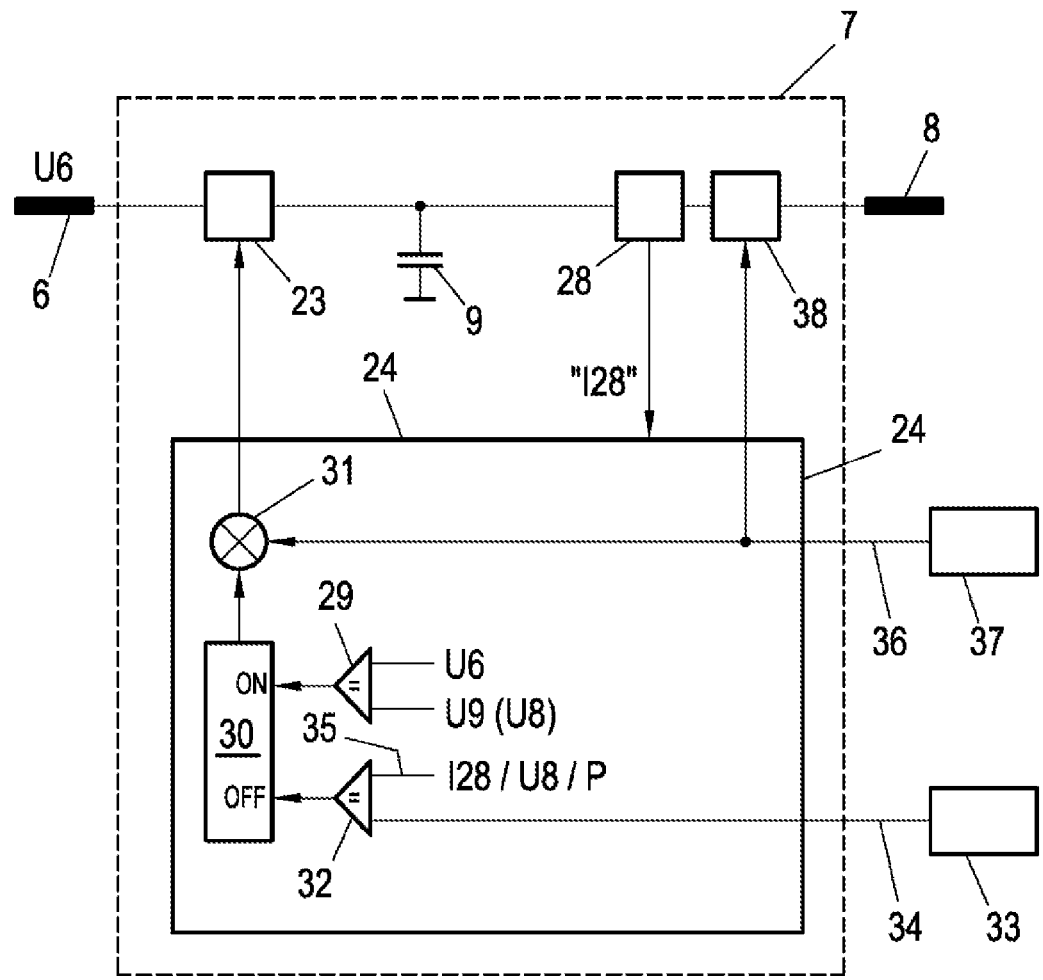
FIG. 9 shows, by way of example, a more detailed circuit diagram of one of the secondary converters according to FIG. 2.

FIG. 9 illustrates an exemplary embodiment of a secondary converter which is denoted 7 here, without the additional point i, for the sake of simplicity, as is its output 8. The input of this secondary converter 7 is connected to the output 6 of the primary converter 2 according to FIG. 5. It is also clear in FIG. 9 that the output store 9, a capacitor of corresponding dimensions, is not directly connected to the output 8, but rather components (explained in more detail below) lie in between.

A switching element 23 which is actuated by a secondary controller 24 is between the input 6 and the output store 9.

In the case of the secondary converter 7 as well, the aim is to obtain the smallest possible losses, which is achieved, inter alia, by avoiding equalizing currents. As already stated above, the aim is, in particular, for the output store or capacitor 9 to be charged, that is to say to be connected to the input voltage U6, when this input voltage U6 is equal to the output voltage or the voltage U9 (see FIG. 10) at the output store 9, in which case the input voltage U6 is intended to be rising at the switch-on-time, as mentioned.

Figure 9A:
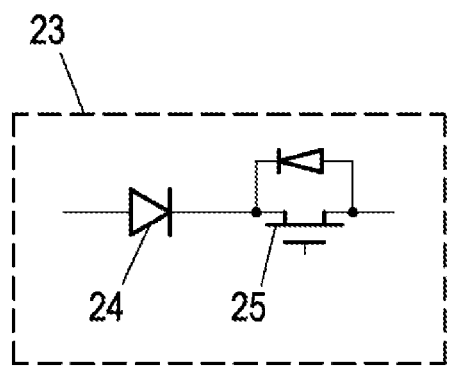
FIGS. 9A and 9B show two examples of the switching means of the secondary converters.
Figure 9B:
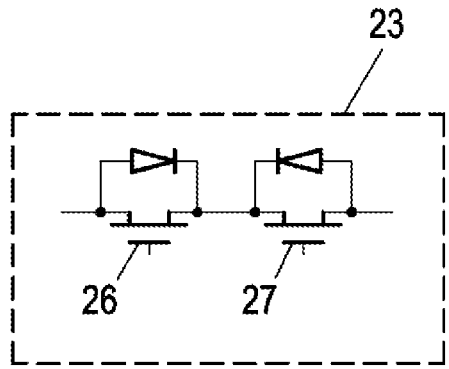

According to FIG. 9A, the switching element 23 preferably consists of a diode 24 and a switching transistor 25 or else, according to FIG. 9B with respect to power loss aspects, possibly consists of two transistors 26, 27 which are arranged in series and have opposite polarity, as can be seen from the directions of the parasitic diodes.

Since the task of the secondary controller 7 is to inject a current at the output 8, a current sensor means 28 is provided between the output store 9 and the output 8, the secondary controller 24 being supplied with a corresponding current measurement signal "I28" in order to obtain information relating to the current flowing from the energy store 9 into the output 8.

Apart from a shunt resistor, inductive sensors, Hall effect sensors and similar sensor means can also be mentioned as examples of such current sensor means 28 (as well as 20 in FIG. 5).

As mentioned, the secondary controller 24 closes the switching element 23 when the voltages at the input 6 and at the output 8 or actually at the energy store 9 are the same. The energy store, that is to say the capacitor 9, is then charged by the rising voltage U6 at the input 6 until the secondary controller 24 determines, in connection with its control algorithm, that sufficient energy is stored in the capacitor 9. The current I28 which flows from the storage capacitor 9 to the output 8 can be used for this determination, for example. The current I28 which is detected with the aid of the current sensor means 28 reaches a maximum when the secondary controller 7 decides to open the switching element 23, which prevents the flow of energy from the input 6 to the output store, that is to say capacitor 9. In this respect, FIG. 9 schematically shows a comparator 29 which is supplied with the voltages at the input 6 and at the output 8 and the output of which is connected to a switching signal element 30 in order to achieve, in the case of identity, a switch-on signal which is applied to the switching element 23 via a multiplier or an AND gate 31. On the other hand, a signal from the current sensor means 28 is supplied to a further comparator 32. This current signal is compared with a setpoint value signal 34 supplied by a setpoint value transmitter 33 and, in the case of identity, a switch-off signal is then generated and the switching element 23 is opened, cf. also FIG. 10.

If the intention is to control to a voltage, the voltage at the output 8 can be directly used for control, as is likewise indicated at the upper input of the comparator 32 as an alternative.

Another possibility is to detect the product of the current I28 and the voltage U8, that is to say the output power PI28× U8, when a power controller is provided for the secondary controller 24. In the two last-mentioned cases, the setpoint value transmitter or the actuator 33, for instance a microcontroller or another suitable circuit, should accordingly be provided in order to provide the desired setpoint value.

Figure 10:
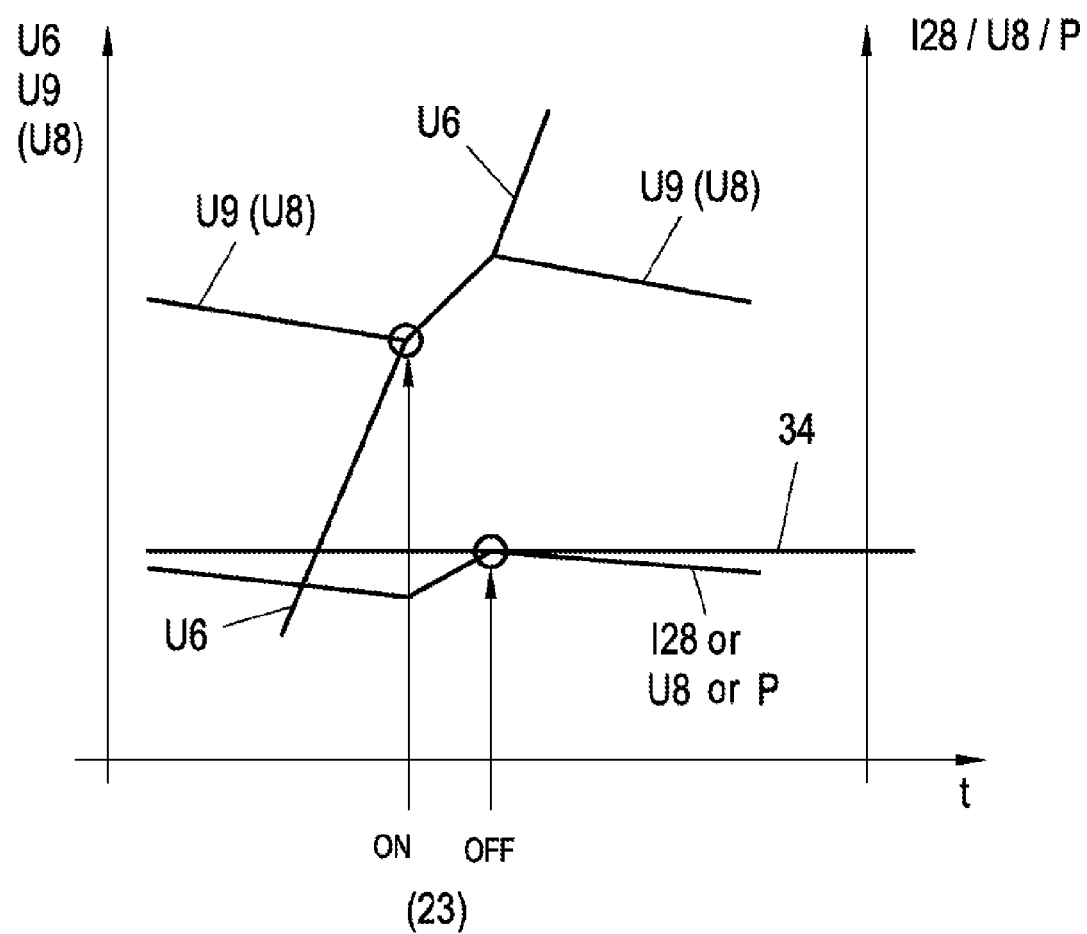
FIG. 10 shows a current/voltage diagram of the relationships when connecting and disconnecting the output store of the secondary converter.

FIG. 10 shows a diagram of this operation of switching the switching element 23 on and off in conjunction with the profile of the input voltage U6, the output voltage U9 or U8 and the actual value 35 at the other input of the comparator 32 (that is to say the current value I28 measured by the sensor means 28 or the output voltage U8 or U9 or else the product P of the current times voltage). The switching signals "ON" and "OFF" for the switching element 23 are also indicated using arrows.

As also illustrated in FIG. 9, provision is also made to enable brief switching-on and switching-off via a control signal 36 which is output by a control element 37, for instance a microcontroller, a switch or any desired other signal generator; in order to avoid having to discharge the output store 9 in this case, a separate switch, for example switching transistor, is provided at the output 8 as separating means 38. In the case of such an embodiment with a switch 38, it is advantageous that the control parameters are retained for the output 8 even if this output 8 is disconnected.

If the invention has been explained in more detail above using particularly preferred exemplary embodiments, it goes without saying that further alterations and modifications are possible within the scope of the invention. Not only a shunt resistor, an inductive current detector or a Hall effect sensor, but rather also other elements, such as PTC or NTC thermistors etc., which make it possible to draw conclusions on the current intensity using a thermal effect or else using an electromechanical or thermomechanical effect, may thus be provided as the current sensor means 20 or 28. Apart from a diode or Schottky diode, a switch, such as a switching transistor, may also be used as the switching or blocking means 11, as already mentioned.

Furthermore, it is not absolutely necessary to configure the primary converter 2 as a boost converter, as shown, when it is certain from the outset that higher output voltages than the input voltage at the input 3 (that is to say the supply voltage) are never required.

What is claimed is:

1. A converter device comprising:
   a primary converter with a resonant circuit, the primary converter configured to output a variable voltage at an output of the primary converter, wherein the variable voltage ranges from <0 V to at least a highest voltage needed to output current in the converter device, and
   means for supplying different currents or voltages for at least two different loads, the means comprising at least two secondary converters, each having an output store and a switch for controllably connecting the output store of that secondary converter to the output of the primary converter, wherein the switch of each secondary converter is configured to disconnect the output store of the respective secondary converter from the primary converter output when the output store has a predefined amount of energy for a next period duration.

2. The converter device of claim 1, wherein the switch of each secondary converter is configured to close when the voltages at the input and the output store of the respective secondary converter become equal.

3. The converter device of claim 1, wherein the primary converter is a boost converter.

4. The converter device of claim 3, comprising a switch-on connection between an energy store of the primary converter and an input of the primary converter, the switch-on connection configured to cause a buck converter behavior of the secondary converters.

5. The converter device of claim 1, wherein the primary converter output comprises a circuit point between an input inductance and a diode arranged between the input inductance and an energy store.

6. The converter device of claim 1, wherein the primary converter has a primary controller configured to control a primary controller switch in a shunt branch.

7. The converter device of claim 6, wherein the primary controller opens the primary controller switch when a current through the primary controller switch is at a minimum, but only if the current is positive.

8. The converter device of claim 6, wherein the primary controller opens the primary controller switch in response to a current through the primary controller switch passing through a positive zero crossing.

9. The converter device of claim 1, wherein each secondary converter has a secondary controller assigned to a voltage at an output or at the output store of that secondary converter output as a controlled variable.

10. The converter device of claim 1, wherein each secondary converter has a current sensor configured to detect a current from the output store to an output of that secondary converter output, wherein the detected current is supplied to a secondary controller of the secondary converter as a controlled variable.

11. A converter device comprising:
a primary converter with a resonant circuit, the primary converter configured to output a variable voltage at an output of the primary converter, wherein the variable voltage ranges from <0 V to at least a highest voltage needed to output current in the converter device, and
means for supplying different currents or voltages for at least two different loads, the means comprising at least two secondary converters, each having an output store and a switch for controllably connecting the output store of that secondary converter to the output of the primary converter
wherein each secondary converter has a secondary controller assigned to a voltage at an output or at the output store of that secondary converter output as a controlled variable,
each secondary converter has a current sensor configured to detect a current from the output store to an output of that secondary converter output, wherein the detected current is supplied to a secondary controller of the secondary converter as a controlled variable, and
each secondary controller configured to use the product of the voltage and the current as a controlled variable for the power output at the respective secondary converter output.

12. The converter device of claim 11, wherein each secondary converter has separating means for separating the secondary converter output from the respective output store.

13. A converter device comprising:
a primary converter with a resonant circuit, the primary converter configured to output a variable voltage at an output of the primary converter, wherein the variable voltage ranges from <0 V to at least a highest voltage needed to output current in the converter device,
at least two secondary converters for supplying different currents or voltages for at least two different loads, the at least two secondary converters each having an output store and a switch for controllably connecting the output store of that secondary converter to the output of the primary converter,
wherein the primary converter has a primary controller configured to control a primary controller switch in a shunt branch and opens the primary controller switch (a) when a current through the primary controller switch is at a minimum, but only if the current is positive, or (b) in response to a current through the primary controller switch passing through a positive zero crossing.

14. The converter device of claim 13, wherein the primary converter is a boost converter.

15. The converter device of claim 14, further comprising a switch-on connection between an energy store of the primary converter and an input of the primary converter, the switch-on connection configured to cause a buck converter behavior of the secondary converters.

16. The converter of claim 13, wherein the primary converter output comprises a circuit point between an input inductance and a diode arranged between the input inductance and an energy store.

17. The converter device of claim 13, wherein each secondary converter has a secondary controller assigned to a voltage at an output or at the output store of that secondary converter output as a controlled variable.

18. A converter device comprising:
a primary converter with a resonant circuit, the primary converter comprising a boost converter and configured to output a variable voltage at an output of the primary converter, wherein the variable voltage ranges from <0 V to at least a highest voltage needed to output current in the converter device,
at least two secondary converters for supplying different currents or voltages for at least two different loads, the at least two secondary converters each having an output store and a switch for controllably connecting the output store of that secondary converter to the output of the primary converter;
wherein the primary converter has a primary controller configured to control a primary controller switch in a shunt branch and opens the primary controller switch when a current through the primary controller switch is at a minimum, but only if the current is positive.

* * * * *